Patented Apr. 16, 1940

2,197,048

UNITED STATES PATENT OFFICE

2,197,048

COMPOSITION OF MATTER AND METHOD OF PRODUCING

Irvin W. Humphrey and Joseph N. Borglin, Wilmington, Del., assignors to Hercules Powder Company, Wilmington, Del., a corporation of Delaware No Drawing. Application January 7, 1939, Serial No. 249,732

12 Claims. (Cl. 260—26)

This invention relates to a new composition of matter and method for its production, more particularly, the composition in accordance with this invention involves the esterification of the reaction product of an ester of a heterocyclic alcohol and an unsaturated rosin acid with maleic anhydride, the unsaturation of the heterocyclic alcohol radical having been reduced by hydrogenation.

In preparing the composition by the method in accordance with this invention, the monohydric heterocyclic alcohol may be hydrogenated and then reacted in the presence of heat with the unsaturated rosin acid as abietic, pimaric, etc., to form a hydrogenated ester, the ester then reacted with maleic anhydride to form an acidic condensation product, and the latter then esterified with an alcohol in the presence of heat.

The monohydric heterocyclic alcohol for use in preparing the composition in accordance with this invention may, for example, be furfuryl alcohol, methoxyfurfuryl alcohol, ethyl furfuryl alcohol, thienyl carbinol, ($C_4H_3S.CH_2OH$) dihydrofurfuryl alcohol, tetrahydrofurfuryl alcohol, etc., and the rosin acid may be in the form, for example, of commercial abietic acid, wood or gum rosin, etc. As equivalents for the alcohols indicated, an inorganic ester of the alcohols, as, for example, furfuryl chloride, tetrahydrofurfuryl chloride, etc., may be used and equivalently where an ester is used in place of an alcohol, salts of abietic acid as, for example, sodium abietate, potassium abietate, etc., may be used, preferably in alcoholic solution, in place of abietic acid or rosin.

In carrying out the method in accordance with this invention, the heterocyclic alcohol, if not previously hydrogenated, will be hydrogenated to partially or fully saturate the radical thereof, and will, as has been indicated, be reacted in the presence of heat and, if desired, also in the presence of an acid catalyst as, for example, p-toluene sulfonic acid, hydrogen chloride, boric acid, etc. Where an acid catalyst is used, however, such will be used in small quantity, say in amount of about 0.01% to 5.0% in order to avoid excessive polymerization of the alcohol. Further, if desired, a hydrocarbon as, for example, toluene, xylene, mineral spirits, or the like, may be used to assist in removing water of reaction.

In carrying out the method in accordance with this invention the heterocyclic alcohol with partially or fully hydrogenated cyclic radical and abietic acid may be treated in any desired quantities preferably with the alcohol in excess of that required for combination with the rosin acid. The reaction may be carried out at any suitable temperature, say for example, within about the range of 100–300° C., with or without superatmospheric pressure depending upon the temperature. The time required will be dependent substantially upon the temperature and whether or not a catalyst is used. As has been indicated, an inorganic ester of a monohydric heterocyclic alcohol and a salt of abietic acid may be used equivalently for the alcohol and abietic acid and when such are used they will be desirably used in alcoholic solution as in solutions of ethyl, butyl, methyl, etc., alcohol and the reaction will be carried out under pressure depending upon the temperature used in order to avoid loss of the alcohol.

As illustrative of procedure in accordance with the method of this invention, for the production, for example, of tetrahydrofurfuryl abietate, for example, 200 grams of rosin, 200 grams of tetrahydrofurfuryl alcohol, obtained by hydrogenation of furfuryl alcohol and 50 cc. of toluene are refluxed for about forty hours at about 200° C. Alternatively 1000 grams of rosin and 1000 grams of tetrahydrofurfuryl alcohol, 25 grams of p-toluene sulphonic acid and 50 cc. of toluene are treated at about 160° C. for about sixteen hours. The reaction may be speeded up in either case by autoclaving at say about 200–250° C. or by proceeding continuously as by passing the reagents through a reaction chamber at a relatively high temperature.

The crude product, tetrahydrofurfuryl abietate, may be purified by washing with an alkaline solution, if necessary, for example, a sodium carbonate solution, to remove excess abietic acid if present, distilling to remove volatiles and fractionation in vacuo to remove any polymerized ester if desired, though it will be understood that the polymerized ester will be as advantageous and equivalent of the unpolymerized ester for certain uses. The ester may be refined by dissolving in a suitable solvent, such as gasoline, mineral spirits, etc., and agitating with a substantially immiscible color body solvent as phenol, resorcinol, aniline, furfural, etc.

The ester, tetrahydrofurfuryl abietate, for example, may be formed by reacting 100 grams of tetrahydrofurfuryl chloride and 300 grams sodium resinate in solution in 1000 g. ethyl, or butyl, etc. alcohol by heating at about 125° C. under a pressure of about 110 pounds per square inch, for about one hour.

The tetrahydrofurfuryl abietate or dihydrofurfuryl abietate will then be reacted with maleic anhydride, or equivalently, maleic acid. Thus, by heating one mole of tetrahydrofurfuryl abietate, or one mole of dihydrofurfuryl abietate, with one mole of maleic anhydride at about 125–200° C., a combination occurs between the said abietate and the maleic anhydride to form a resinous, acidic reaction product. This resinous acidic reaction product is then esterified with an alcohol, e g., a monohydric alcohol such as methyl, ethyl, propyl, butyl, bornyl, tetrahydrofurfuryl, benzyl, cyclohexanol, abietyl, hydroabietyl, stearyl, oleyl, naphthenyl, pimaryl, hydropimaryl, ethylene glycol monoethyl ether, etc., alcohols, or either partially or completely esterified with a polyhydric alcohol, such as ethylene glycol, diethylene glycol, triethylene glycol, glycerol, pentaerythrite, etc., or mixtures of the foregoing alcohols, yielding products adapted for use in protective coatings and plastics. The esterified, or partly esterified product, may be modified by the addition of rosin, hydrogenated rosin, linseed oil or China wood oil, the free acids of these oils, acids such as stearic, oleic, palmitic, abietic, hydroabietic, pimaric, hydropimaric, furoic, succinic, adipic, maleic acid or anhydride, phthalic acid or anhydride, etc., or mixtures thereof.

As examples of the esterification of the tetrahydrofurfuryl abietate-maleic anhydride condensation product, (1) 400 grams of N wood rosin were esterified by heating with 270 grams of tetrahydrofurfuryl alcohol. The esterification was conducted at a temperature of 180–215° C. during forty-three hours. Excess alcohol was then distilled off under reduced pressure, whereby 440 grams of a viscous liquid, acid number 57, were obtained. This product is tetrahydrofurfuryl abietate; (2) 400 grams of the above tetrahydrofurfuryl abietate were condensed with 102 grams of maleic anhydride by heating the reactants for five hours at a temperature of 165–200° C. The resulting condensate, 480 grams, rated E in color; (3a) 200 grams of the above condensate from step 2 were heated with 296 grams of butanol for ten hours at a temperature of 120–130° C. Excess butanol was then distilled off under reduced pressure, leaving 220 grams of a soft resin. This product represents the butyl ester of the above condensate; (3b) 200 grams of the condensate from step 2 were heated with 102 grams of ethylene glycol for a period of eight hours at a temperature of from 200–212° C. Excess glycol was then distilled off under reduced pressure, whereby 240 grams of an E+ grade of glycol ester were obtained.

Steps 1, 2, 3a and 3b were conducted under a blanket of carbon dioxide to prevent undue oxidation.

As will now be apparent, the product in accordance with this invention will be a reaction product formed by reacting a monohydric heterocyclic alcohol having a partially or fully hydrogenated radical and an unsaturated rosin acid, further reacting this product with maleic anhydride to form a resinous acidic product and esterifying the latter with an alcohol. Further, as will now be apparent, the method in accordance with this invention will involve hydrogenation of a monohydric heterocyclic alcohol to render the radical thereof partially or fully saturated with hydrogen, if it is not already; reaction of this alcohol with an unsaturated rosin acid, as abietic acid; reaction of the ester so formed with maleic anhydride to form a resinous acidic reaction product; and esterification of the latter with an alcohol to produce an ester.

The product in accordance with this invention will be found advantageous for use variously in the commercial arts and more especially as an ingredient in coating compositions as, for example, lacquers, films, various plastic compositions. Thus, esters of the reaction product of tetrahydrofurfuryl abietate with maleic anhydride or of dihydrofurfuryl abietate with maleic anhydride may be employed in lacquer compositions, for example, and by using 8 parts of any of the above resinous substances, 4 parts of dammar, 10 parts of nitrocellulose and 78 parts of solvents and diluents.

It will be understood that the details and examples hereinbefore set forth are illustrative only, and that the invention as broadly described and claimed is in no way limited thereby.

This application forms a continuation-in-part of our application Serial No. 152,666, filed July 8, 1937, which is in turn a continuation-in-part of our application, Serial No. 619,121 filed by Humphrey and Borglin June 24, 1932, for Resin acid ester and method of producing the same, now United States Patent Number 2,089,375.

What we claim and desire to protect by Letters Patent is:

1. The reaction product of an alcohol with the reaction product of an ester of a monohydric heterocyclic alcohol and an unsaturated rosin acid with maleic anhydride, the unsaturation of said heterocyclic alcohol being reduced by hydrogen.

2. The reaction product of a monohydric alcohol with the reaction product of an ester of a monohydric heterocyclic alcohol and an unsaturated rosin acid with maleic anhydride, the unsaturation of said heterocyclic alcohol being reduced by hydrogen.

3. The reaction product of a polyhydric alcohol with the reaction product of an ester of a monohydric heterocyclic alcohol and an unsaturated rosin acid with maleic anhydride, the unsaturation of said heterocyclic alcohol being reduced by hydrogen.

4. The reaction product of an alcohol with the reaction product of an ester of tetrahydrofurfuryl alcohol and an unsaturated rosin acid with maleic anhydride.

5. The reaction product of an alcohol with the reaction product of an ester of a monohydric heterocyclic alcohol and abietic acid with maleic anhydride, the unsaturation of said heterocyclic alcohol being reduced by hydrogen.

6. The reaction product of butyl alcohol with the reaction product of an ester of tetrahydrofurfuryl alcohol and abietic acid with maleic anhydride.

7. The reaction product of an alcohol with the reaction product of an ester of tetrahydrofurfuryl alcohol and abietic acid with maleic anhydride.

8. The reaction product of ethylene glycol with the reaction product of an ester of tetrahydrofurfuryl alcohol and abietic acid with maleic anhydride.

9. The reaction product of glycerol with the reaction product of an ester of tetrahydrofurfuryl alcohol and abietic acid with maleic anhydride.

10. The method which includes reacting a monohydric, heterocyclic alcohol with abietic acid, the unsaturation of said alcohol being reduced by hydrogen, reacting the ester formed with maleic anhydride, and esterifying the resulting product with an alcohol.

11. The method which includes reacting tetrahydrofurfuryl alcohol with abietic acid, reacting the ester formed with maleic anhydride, and esterifying the resulting product with an alcohol.

12. The method which includes reacting a monohydric heterocyclic alcohol with an unsaturated rosin acid, the unsaturation of said alcohol being reduced by hydrogen, reacting the ester formed with maleic anhydride, and esterifying the resulting product with an alcohol.

IRVIN W. HUMPHREY.
JOSEPH N. BORGLIN.